Nov. 8, 1949  E. F. ANDREWS  2,487,405
AIRCRAFT
Filed Aug. 12, 1943  6 Sheets-Sheet 1

Inventor:
Edward F. Andrews
By Williams, Bradbury/Hinkle
Attorneys

Nov. 8, 1949     E. F. ANDREWS     2,487,405

AIRCRAFT

Filed Aug. 12, 1943     6 Sheets-Sheet 4

Nov. 8, 1949  E. F. ANDREWS  2,487,405
AIRCRAFT

Filed Aug. 12, 1943  6 Sheets-Sheet 6

Inventor
Edward F. Andrews
By Williams, Bradbury & Hinkle
Attorneys

Patented Nov. 8, 1949

2,487,405

UNITED STATES PATENT OFFICE 2,487,405

AIRCRAFT

Edward F. Andrews, Chicago, Ill.

Application August 12, 1943, Serial No. 498,286

12 Claims. (Cl. 244—102)

The present invention relates to aircraft, and has for its primary object the provision of new and improved alighting gear for aircraft. This application is a continuation-in-part of application, Serial No. 148,085 filed June 14, 1937, now U. S. Patent 2,330,803, and of application, Serial No. 386,511 filed April 2, 1941, now abandoned, the latter being in turn a division of application, Serial No. 190,171 filed February 12, 1938, now U. S. Patent 2,307,654.

An object of the present invention is to provide a new and improved alighting gear which may be projected and retracted in a simple and effective manner.

Another object of the present invention is to provide an aircraft with new and improved retractable alighting gear comprising a supporting means pivotally movable about a single axis from a retracted position on one side of the axis to a projected or alighting position wherein the wheel is located at the other side of the axis and below the fuselage of an aircraft, and wherein the wheel supporting member is so located at the other side of the axis and is so inclined that the weight of the aircraft tends to move it further toward said other side about said axis.

A further object of the present invention is to provide a new and improved alighting gear of the character aforesaid with a closure plate adapted to close an opening in the aircraft into which the alighting gear is retractable.

A further object of the present invention it to provide a new and improved aircraft having an alighting gear comprising a pair of retractable wheels and a retractable ground contacting member to prevent the aircraft from nosing over, which alighting gear and contacting member are constructed and arranged to be simultaneously projected or retracted.

Another object of the present invention is to provide an aircraft with new and improved alighting gear and shock absorbing means.

Another object of the present invention is to provide new and improved shock absorbing means for use with retractable alighting gear, wherein the shock absorbing means is a separate unit adapted to be cooperatively associated with the alighting gear only when the alighting gear is in projected position.

A further object of the invention is to provide a unitary mechanism for performing the dual functions of shock absorption and actuation of the alighting gear between its two positions.

A further object of the present invention is to provide an aircraft with a new and improved alighting gear and shock absorber arrangement wherein the shock absorber fluid is used as the actuating means of a servo motor used in projection of the alighting gear.

Another object of the present invention is to provide an aircraft with a new and improved alighting gear wherein rapid projection of the alighting gear may be accomplished.

Another object of the present invention is to provide an aircraft with a new and improved shock absorber and a retractable alighting gear construction wherein the movement of the shock absorber mechanism to absorb the landing shock and the movement of alighting gear mechanism from one to the other of its two positions occurs about the same pivotal axis, thereby to provide an efficient construction utilizing but relatively few moving parts.

Other objects and advantages of the present invention will become apparent from the ensuing description, in the course of which reference is had to the accompanying drawings, in which.

Referring now to the drawings, and more particularly Figs. 1 to 4, inclusive, it may be noted that the aircraft comprises a streamlined fuselage 10, a propeller 11 at its forward end, a retractable rotating wing structure 12, a fixed wing 13, and a retractable alighting gear comprising a pair of retractable landing wheels 14. The propeller 11 is preferably of the variable pitch type having associated therewith a pitch control mechanism 15 operable by a control handle 16. Two seats 17 are provided for an operator and a passenger, and to provide the desired visibility, a section 18 of the fuselage covering is constructed of transparent material.

The aircraft illustrated in Figs. 1 to 4, inclusive, is of a composite type wherein the rotating wing structure 12 is utilized during take-off and slow speed flight, and is retracted into a compartment 19 within the fuselage during high speed flight when the aircraft is sustained by the fixed wing 13 which is of small size. The details of operation of the aircraft and of the retraction and projection of the rotating wing, and of other related features, form no part of the present invention, and for a further description thereof reference may be had to my copending application, Serial No. 148,085, filed June 14, 1937. It is believed sufficient for the purposes of the instant application to provide but a brief description of the various controls and mechanisms which are not closely related to the subject matter being claimed in this application.

Figure 1:
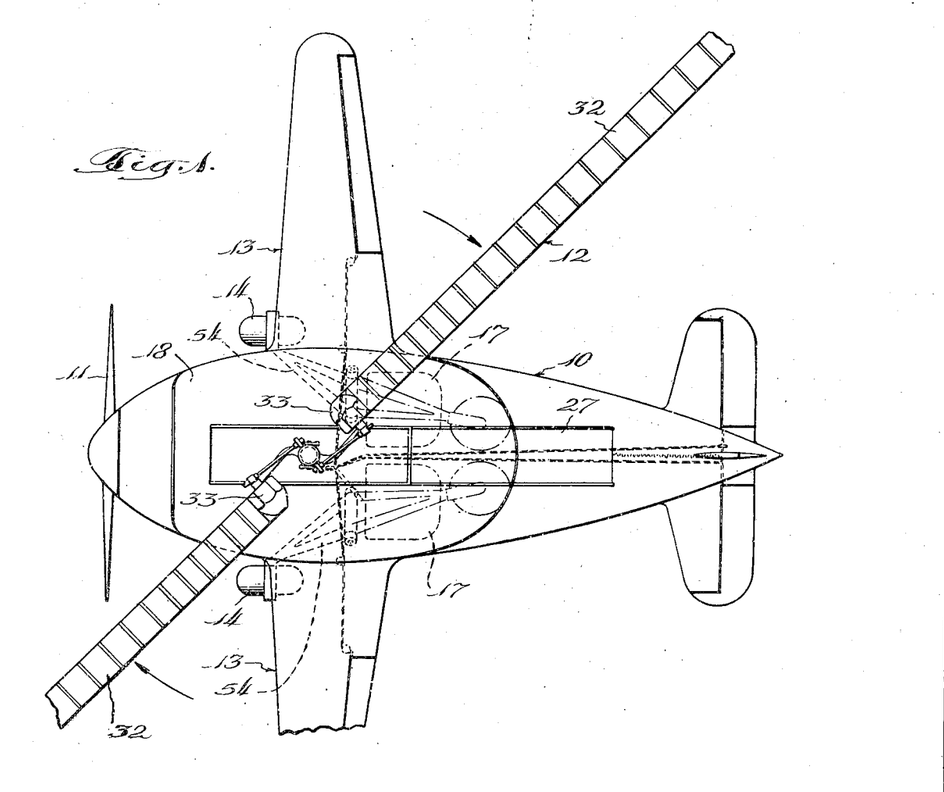
Fig. 1 is a plan view, partly broken away, of an aircraft embodying the present invention.
Figure 2:
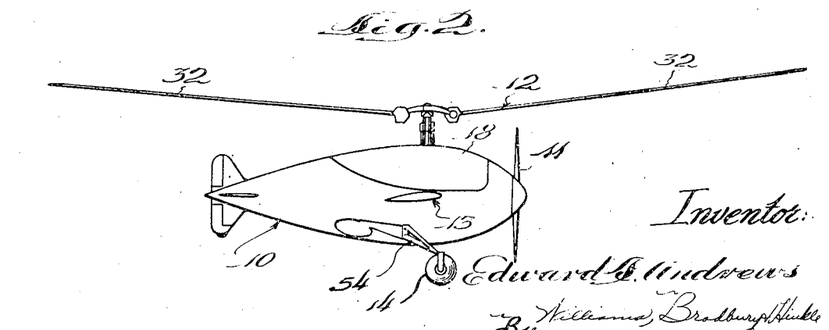
Fig. 2 is a side elevational view, on a smaller scale, of the aircraft illustrated in Fig. 1.
Figures 3, 4, 5:
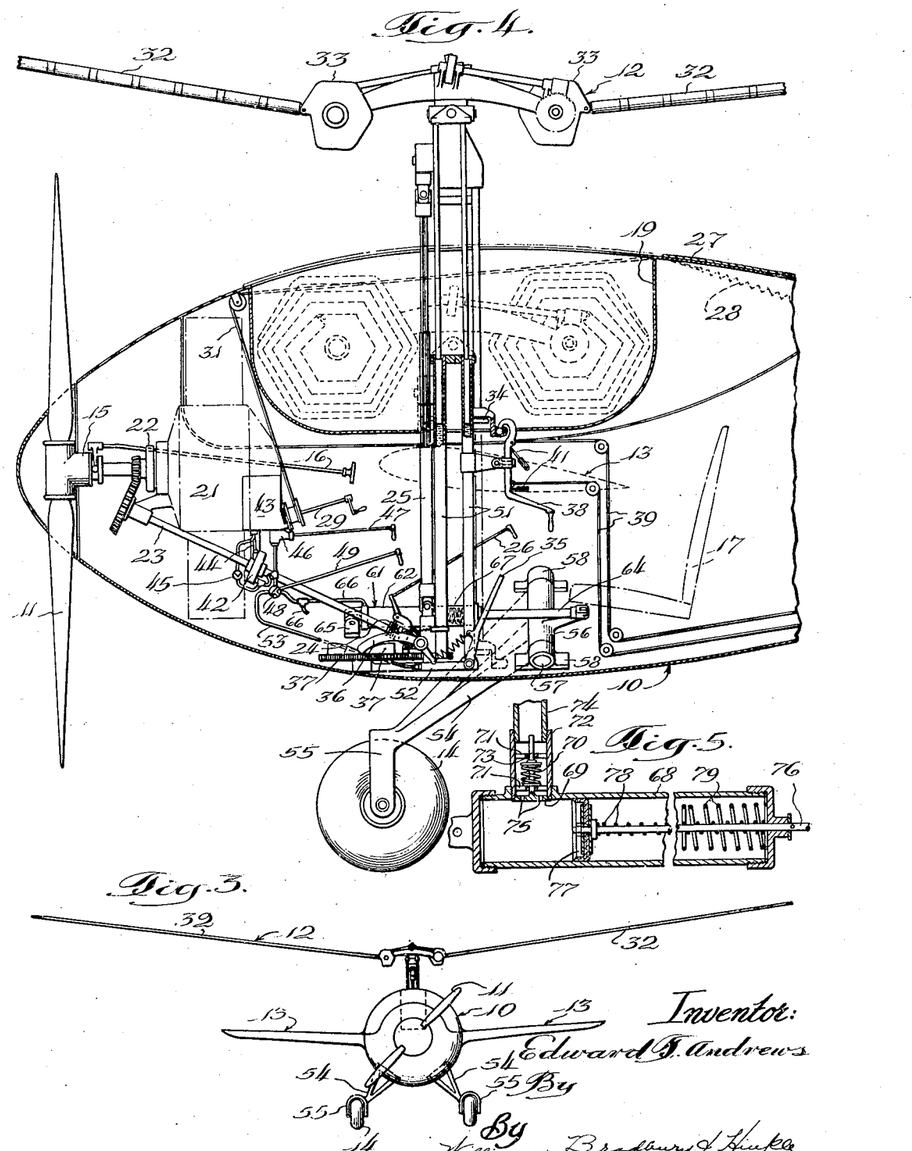
Fig. 3 is a front elevational view of the aircraft.
Fig. 4 is a fragmentary longitudinal cross sectional view of the forward end of the aircraft.
Fig. 5 is an enlarged fragmentary detail illustrating features of a modified construction of a combined alighting gear operating and shock absorbing means.

The aircraft includes a motor 21 for rotating the propeller 11 through an over-running clutch 22. The motor also drives the rotating wing structure through a shaft 23, a clutch 24, and a generally vertically disposed shaft section 25. The interconnection of shafts 23 and 25 is effected by the clutch 24 which is controlled by a control handle 26. The over-running clutch 24 enables the shaft 23 to be driven by the propeller in the event the motor is not running, so that the alighting gear may be extended even though the engine fails during flight.

The compartment 19 may be closed by a slidably mounted panel 27, the position of which is controlled by a spring 28 and a cranking mechanism 29 connected to the panel by a cable 31. Thus, when the rotating wing structure is retracted into its compartment 19, the compartment may be closed by the panel 27.

The rotating wing structure 12 includes a pair of extensible rotating wings 32 adapted to be wound upon drums 33, after which the structure is movable downwardly into the compartment 19. The retraction and extension of the rotating wings 32 is controlled by the rotation of a hand wheel 34. After the wings have been retracted the structure may be withdrawn into the compartment 19, in a manner to be described shortly, provided the structure has been properly positioned in a fore and aft position by moving a lever 35 rearwardly. When this is done, a lever 36 is forced against cams 37 rotating with the rotating wing structure, thereby to arrest the drums 33 in the proper fore and aft relation for retraction into the compartment 19.

The rotating wing structure is so constructed and arranged that its axis of rotation may be inclined, thereby to provide a roll and pitch control for the aircraft. This control is effected by a control handle 38 operatively connected to the rotating wing structure. The control handle 38 is also utilized to control the high speed flight of the aircraft after the rotating wing structure has been retracted. The high speed flight is controlled through cables 39 controlling the elevators and cables 41 controlling the ailerons of the aircraft, in a manner disclosed in my copending application.

The projection of the rotating wing and also of the alighting gear is effected hydraulically, whereas the retraction of the rotating wing is effected by gravity and the retraction of the alighting gear is effected by resilient means. The necessary hydraulic pressure is provided by a pump 42 driven through the shaft 23. The pump has associated with it a suitable reservoir 43 for the hydraulic fluid, which is preferably oil. The inlet of the pump is connected to the reservoir by a conduit 44. The outlet is connected to the reservoir through an automatically operating pressure relief valve 45, and also through a valve 46 manually operable to open and closed positions by a control handle 47.

Oil under pressure is supplied to the rotating wing and alighting gear projecting apparatus through a four-position valve 48 which is operable into its various positions manually, as by a control handle 49. In one position of the valve 48 the valve is closed. In a second position the outlet of the pump is connected to servo motor means for projecting both the rotating wing and alighting gear structures. In a third position the outlet of the pump is connected to the rotating wing projecting servo motor, whereas in the fourth position the outlet of the pump is connected to the alighting gear projecting servo motor. When the outlet of the pump is thus connected to one or both servo motors the position of valve 46 determines whether or not the devices are to be projected or retracted. If the valve 46 is closed, then the devices are projected, whereas if valve 46 is open and thus connects the outlet of the pump directly to the reservoir, then the devices will be retracted, provided, of course, that they are in their projected positions. The relief valve 45 is set for a sufficiently high pressure to ensure projection of the rotating wing structure and of the alighting gear when the valve 46 is closed, but permits a restricted flow of oil to the reservoir under certain conditions to be described hereinafter.

The rotating wing structure is projected when oil under pressure is supplied to cylinders 51 (of which there are four, although but two are shown). The lower ends of the cylinders 51 communicate with headers 52 connected by a conduit 53 to the valve 48.

The present invention pertains particularly to the construction and arrangement of the retractable alighting gear. The alighting gear includes the previously referred to wheels 14 which are mounted on pivotally movable supports 54 which terminate in yoke-like portions 55 partially surrounding the wheels. The supports are each movable about a single transverse axis inclined downwardly and inwardly, as best shown in Figs. 3 and 4. The upper ends of the supports 54 terminate in bearing members 56 rotatably movable about shafts 57. The shafts may be attached to the fuselage in any suitable manner, as by the spaced apart bearing blocks 58, when the wheels are to be retracted into the fuselage. If desired, the shafts could be secured to the wings or nacelles if the wheels should be retracted into the latter.

In accordance with one of the features of the present invention, the alighting gear construction is such that in retracted position the wheels are located to one side of the axis, whereas in alighting position the wheels and their supports are located at the other side of the axis and the supports are so inclined that the weight of the aircraft tends to move them further toward said other side about the axis. Accordingly, the alighting gear is securely held in alighting position when the aircraft lands.

In accordance with another feature of the present invention, the actuation of the alighting gear between its two positions is performed by a unitary mechanism performing also the function of a shock absorber mechanism. In addition, the construction is such that the movement of the shock absorber mechanism to absorb the landing shock and the movement of the alighting gear mechanism between its two positions occur about the same pivotal axis.

Each of the alighting gear supports 54 is projected by a servo motor mechanism, indicated generally by the reference character 61, which is best illustrated in Fig. 4, to which reference is now had. It should be understood that there are two of these mechanisms, although but one has been illustrated. The mechanism includes a cylinder 62 within which is slidably mounted a piston (not shown) connected by a piston rod 64 to the bearing member 56. The connection between the piston rod 64 and bearing member is pivotal, and the cylinder 62 is pivotally attached to the fuselage, as through a block 65. It should be understood, however, that other constructions may be utilized to interconnect the piston and arm. For instance, the cylinder may be fixed and the piston be connected to the arm by a pin and slot connection (the slot being formed in the piston rod) or by a connecting rod pivotally attached to the piston and arm.

The projection of the landing gear into alighting position is accomplished by operating control handle 47 to close the bypass valve 46, and operating control 49 to position valve 48 to connect the outlet of pump 42 to the cylinders 62 through conduits 66 of restricted size enabling oil to be supplied to and flow from the cylinders but relatively slowly. When the controls are so operated, oil is forced by the pump into the cylinders, thereby to move the pistons therein toward the right as viewed in Fig. 4. The pistons moving to the right compress springs 67 located between the pistons and the right ends of the cylinders, and move the landing wheel supports 54 clockwise about shafts 57 until they reach their alighting positions. The overpressure relief valve 45 is set so that, or the pump may be designed to produce a pressure such that, the springs 67 are not fully compressed. Then when the aircraft lands, the force of impact results in the sudden compression of the springs 67 by the movements of the pistons. The pump thereafter slowly supplies additional oil into the cylinders 62 through the restricted conduits 66, but not until the springs have been further compressed substantially solely by the force of the impact. After the force of impact decreases, the springs 67 expand forcing the piston to the left to return the oil back through the conduits 66 and through the overpressure relief valve 45 into the reservoir. The restricted outflow of oil from the cylinders provides a good shock absorbing action.

The alighting gear is returned to its retracted position by the spring 67 located within the cylinder 62 and bearing against the piston (not shown) and the opposite end of the cylinder. The spring is compressed during the projection of the alighting gear, so that when the valve 46 is opened and valve 48 connects the cylinder 61 to the reservoir, the spring 67 moves the piston and thereby retracts the alighting gear.

Reviewing the actuation and shock absorption it may be noted these are performed by a unitary mechanism and that the retraction and projection movements and also the movements in shock absorption occur about the same pivotal axis, namely, the shaft 57 about which the landing wheel supports 54 move. A simplified and rugged construction is thus provided.

The alighting gear is preferably so constructed and arranged that the wheels 14 are retracted into the fuselage, preferably behind the passenger seats 17 as indicated in Figs. 1 and 4, although, as previously indicated, the wheels could be retracted into other parts of the aircraft. In retracted position the wheels thus are located substantially centrally of the fuselage and to the rear of the wings 13, whereas in projected position they are located relatively far apart and below the front of the wings. In other words, the wheels and wheel supports are swung forwardly, outwardly, and downwardly to a landing position wherein the shock of impact with the ground aids in holding the alighting gear in position. Undue movement of the alighting gear on landing is prevented by the shock absorber mechanism, including the springs 67 within the cylinders 62.

If it is desired to project the alighting gear rapidly the cylinder may be supplied with oil rapidly and the outflow may be retarded and the cylinder constructed with two springs, one operating primarily in retraction and the other in shock absorption. The rapid inflow and retarded outflow may be obtained by placing a valve in the connection between the pump and cylinder, as illustrated in Fig. 5. In this figure the cylinder 68 is supplied with oil through a valve 69 lightly biased to a closed position by a spring 70 acting against one of a pair of spaced apart webs 71 in a detachable valve casing 72 and a washer secured to the valve stem 73. Oil is supplied to the valve casing through a conduit 74 capable of supplying oil to the cylinder at a substantial rate. The flow of oil from the cylinder is restricted by the valve so that oil can flow only through apertures 75 in the valve, thus insuring the slow dissipation of the energy of the landing shock stored in the spring so that the aircraft does not bounce into the air. Thus oil is supplied to the cylinder more rapidly than it can flow from it, because valve 69 is fully open when oil is supplied and closed during return flow.

The alighting gear is actuated by a piston rod 70 connected to the piston 77. The piston is moved to the right, as viewed in Fig. 5, by the oil and against a spring 78 adapted to return the piston to its original position in the retraction of the alighting gear, i. e., when valve 46 is opened. A heavier and shorter spring 79 is provided to absorb the shock of impact upon landing when the wheels are in alighting position. The force of the impact compresses the springs 78 and 79 and oil flows into the cylinder to keep it filled. When the force of impact decreases, the springs move the piston to the left, slowly forcing the oil back to the reservoir through openings 75 in the now closed valve 69 and the relief valve 45.

The use of two springs within the cylinder, as shown in Fig. 5, is preferable to the use of a single spring, and it is contemplated that the construction of Figs. 1 to 4 could be modified in this respect.

Figures 6, 7:
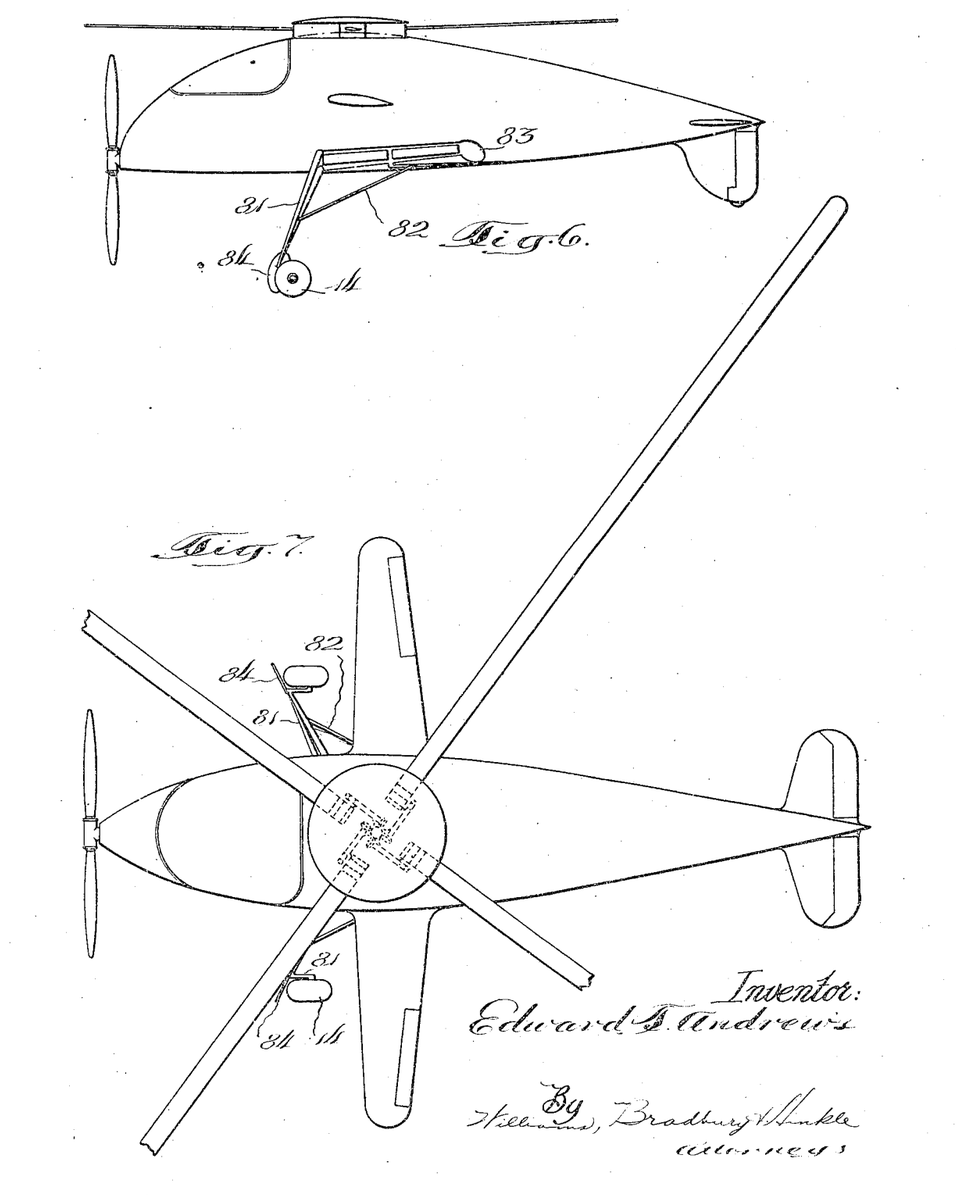
Fig. 6 is a side elevational view of a modified aircraft construction, wherein the alighting gear support has secured to it cover plates for closing wheel receiving apertures in the fuselage.
Fig. 7 is a plan view of the aircraft illustrated in Fig. 6.

In the modification of the invention illustrated in Figs. 6 and 7, the landing wheels 14 are so constructed and arranged that the wheels are located somewhat further forwardly of the aircraft in retracted position. The wheels are mounted on pivotally movable supports 81 pivotally secured to the aircraft, preferably the fuselage, and braced relative to the aircraft when in projected position by braces 82. The aircraft is provided with recesses for the supports 81 and braces 82, and recesses 83 are also provided for the wheels 14. Cover plates 84 are secured to the wheel supports 81, and these are so positioned relative to the wheel supports, and the axes of pivotal movement of the wheel supports are so located and arranged, that when the wheels are in retracted position the cover plates 84 close the recesses 83, whereas in alighting position the cover plates 84 are located above the ground so that the wheels may perform their intended function. It should be noted that the instant construction requires no relative movement between the cover plates and the wheel supports in order for the plates to close the recesses in retracted position and to clear the ground in alighting position.

In Figs. 8 to 12, inclusive, there is illustrated another embodiment of the present invention applied, for illustrative purposes, to a power soarer, certain features of which are disclosed and claimed in my copending application, Serial No. 386,511, filed April 2, 1941, which is a division of my application, Serial No. 190,171, filed February 12, 1938.

The aircraft comprises a fuselage 100, the front part of which is enlarged to provide a chamber 101 for the accommodation of two passengers who may sit side by side. The upper portion 102 of the chamber 101 may be in the form of a transparent housing in order to provide visibility for the passengers in all directions. The fuselage is provided with elevators 103 and with a rudder 104, both of which may be actuated in the usual manner. The rudder 104 provides bearings for a small wheel 105 which projects below the rudder and the adjacent portion of the fuselage. The wheel 105, being mounted on the rudder 104, enables the machine to be steered on the ground by means of the rudder controls. Adjacent the nose of the fuselage the aircraft is provided with a ground contacting means, preferably in the form of a skid 106. This skid is capable of being drawn up into a slot 107 (see Fig. 12) which extends lengthwise of the fuselage along the under surface of the nose. When retracted into the slot the skid fills the slot so as to complete the smooth outer form of the fuselage. The skid is pivotally connected to the fuselage at 108 and also to a rod 109 extending outside of a dash pot 110 which in turn is pivotally mounted within the fuselage. A spring 111 within the dash pot forces the rod 109 and the skid 106 downwardly to the lower limit of movement of the rod. The dash pot strongly opposes sudden movements of the skid 106, while gradual movements of the skid from its position within its slot downwardly are permitted under the influence of the spring 111 and gradual upward movements from its operating position are permitted when sufficient force is applied to overcome the spring 111.

The nose skid is retracted into the fuselage by means of a crank 112 adapted to rotate a drum 113 which is operatively connected to the nose skid through a cable 114. The drum is affixed to a shaft 115 connected to the crank through bevel gearing 116. When the crank is rotated in one direction the cable 114 is wound on the drum and the skid 106 drawn upwardly into its slot against the action of spring 111. When the crank is rotated in the opposite direction the cable is unwound from the drum and the spring 111 forces the skid downwardly. It will likewise be understood that when the skid 106 comes into forcible contact with the ground in landing, the dash pot 110 prevents the rapid upward movement thereof so that it takes the impact, which is thus in part communicated to the fuselage and in part dissipated in heat in the dash pot 110. The spring 111 tends to maintain the skid fully extended. A very effective braking action can be had by operating the elevator 103 so as to raise the tail and force the skid firmly against the ground. The location of the skid near the nose of the fuselage effectively prevents the aircraft from nosing over despite the relatively rearward position of the additional members of the alighting gear.

Figures 8, 9, 10, 11, 12:
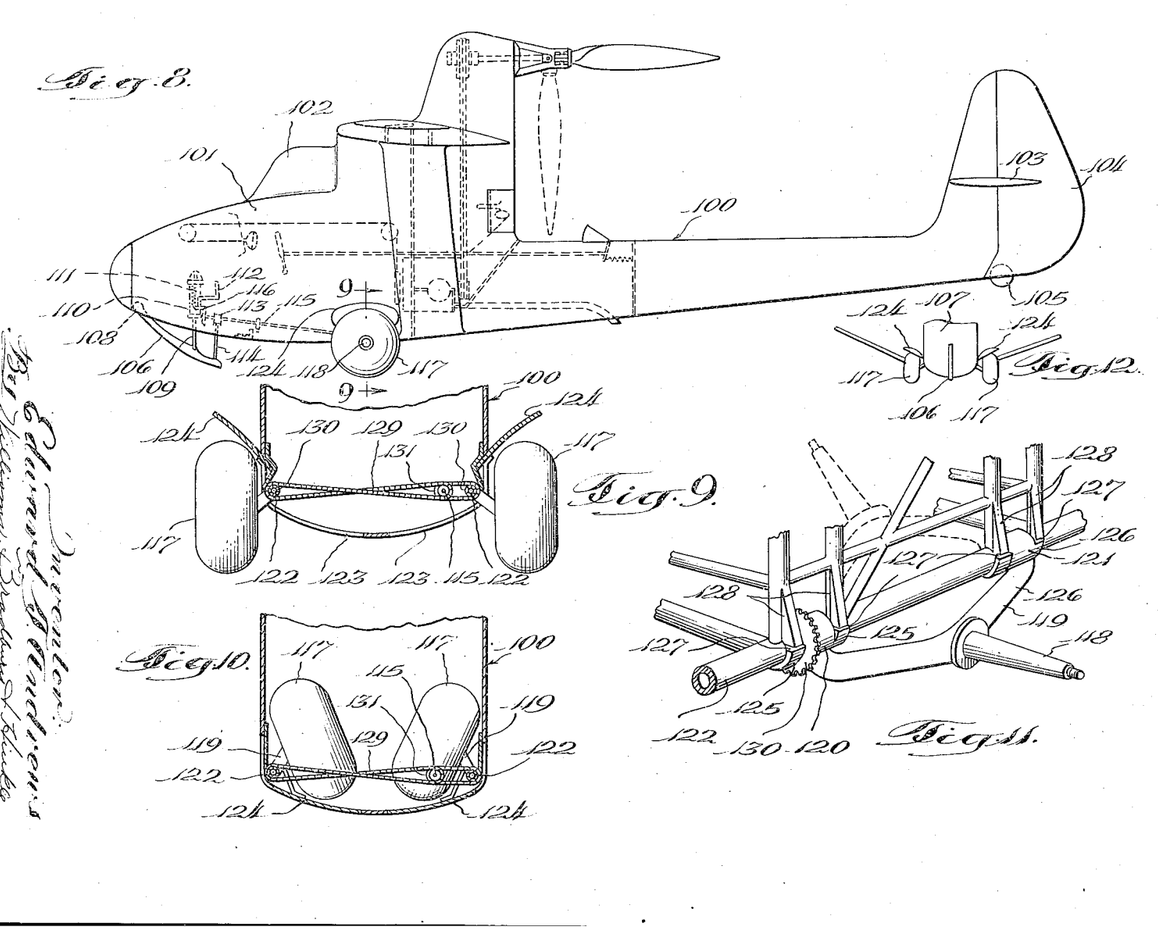
Fig. 8 is a side elevational view of a power soarer having embodied therein a modified form of the alighting gear of the present invention.
Fig. 9 is a fragmentary sectional view taken along the line 9—9 of Fig. 8, and illustrating details of the mounting and means for actuating the main landing wheels.
Fig. 10 is a similar view showing the wheels in retracted position.
Fig. 11 is a fragmentary perspective view, on an enlarged scale, of one wheel and illustrating the manner in which the wheels are mounted.
Fig. 12 is a fragmentary front elevational view of the aircraft showing the wheels projected for alighting.

The aircraft is provided with a retractable alighting gear constructed in accordance with the principles of the present invention. The alighting gear includes the two wheels 117 which are pivotally mounted on stub axles 118. These axles are carried by yokes 119 (see particularly Fig. 11, illustrating one of two identical wheel supports) which are pivotally mounted by means of bushings 120 and 121 on suitable longitudinal frame members 122 of the fuselage frame. The frame members 122 are preferably located at the lower corners of the fuselage, as shown in Figs. 9 and 10, and the lower wall of the fuselage is provided with openings 123 through which the wheels 117 and the yokes 119 are adapted to pass into the interior of the fuselage, that is, from the position shown in Fig. 9 to that shown in Fig. 10.

The yokes 119 carry closure plates 124, which are adapted to close the openings 123 when the landing wheels are moved into their retracted positions, as shown in Fig. 10. When the wheels are projected from that position into the alighting position shown in Fig. 9 for the purpose of supporting the aircraft on the ground, the closure plates 124 serve as mud guards to prevent mud or water from being splashed over the fuselage.

When the wheels are in alighting position, pairs of abutments 125 and 126 formed integrally with bushings 120 and 121, respectively, engage resilient damping pads 127, composed, for example, of shock absorbing rubber, which may be suitably carried by abutments 128 upon elements of the framework of the fuselage, as shown in Fig. 11, so that components of the force applied to the wheels by contact with the ground may displace the wheels upwardly from their position shown in Fig. 9 only a limited amount as determined by the compression of the resilient damping pads. It will be understood that the pads 127 are shown only by way of example, and that any suitable damping means may be substituted therefor.

The landing wheels 117 are actuated between their retracted and projected positions in unison by means of chains 129 extending around sprockets 130 integral with or rigidly secured to the bushings 120 of yokes 119. The chains are operatively engaged by a sprocket wheel 131 rigidly carried by the previously mentioned shaft 115 which, it may be remembered, is rotated to effect retraction and projection of the nose skid 106. It will thus be seen that when the nose skid 106 is released to move downwardly the wheels 117 are moved from the retracted position in which they are shown in Fig. 10 to the alighting position in which they are shown in Fig. 9, and that when the wheels are retracted the skid is also retracted into its associated slot.

The wheels 117 are located somewhat in front of the center of gravity of the machine when fully loaded, so that when the wheels are projected the wheel 105 will remain in contact with the ground although it will carry only a very light load. Under these circumstances the skid 106 will substantially clear the ground. The position of the wheels 117 is, of course, sufficiently close to the center of gravity so that the elevator 103 will control the angle of the aircraft with only a small relative air flow over its surface.

Figures 13, 14, 15, 16:
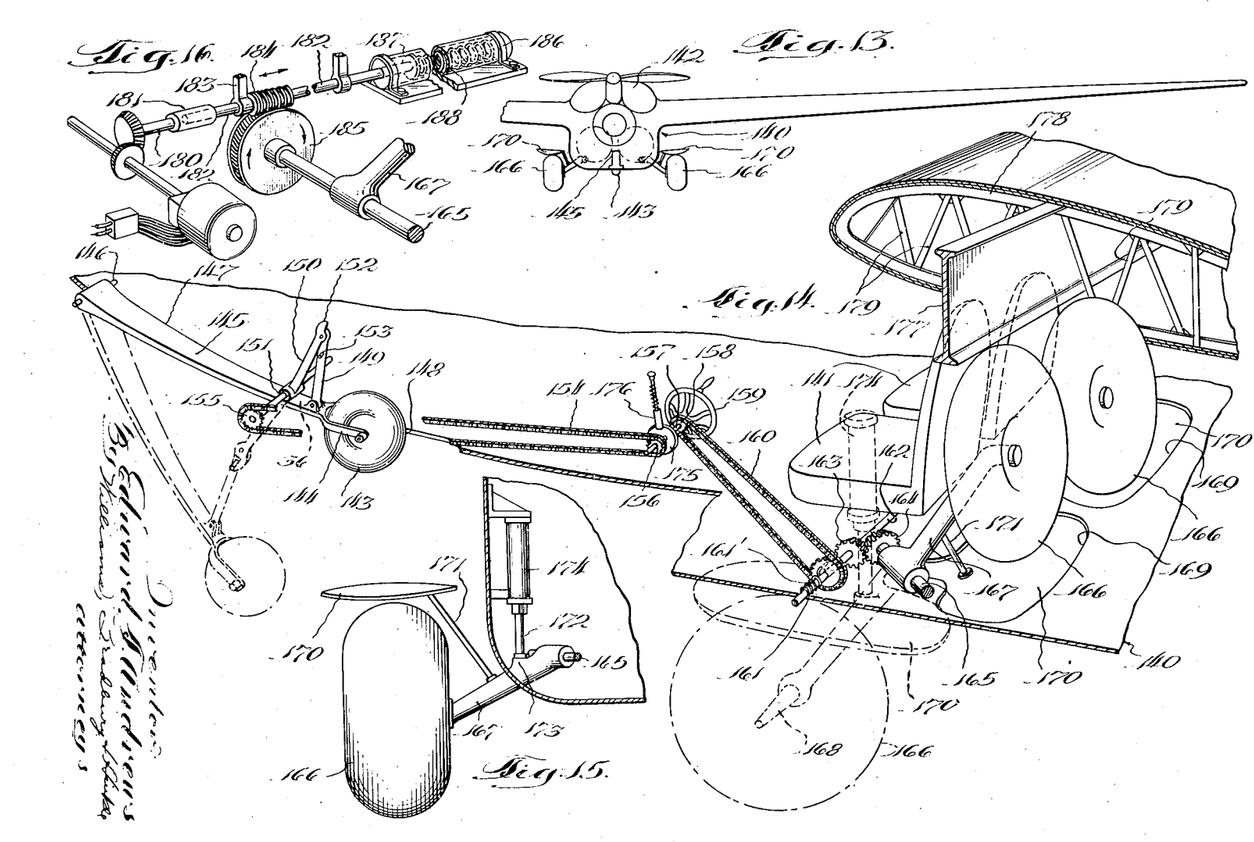
Fig. 13 is a front elevational view of another embodiment of the present invention.
Fig. 14 is a fragmentary perspective view, on an enlarged scale, of the aircraft shown in Fig. 13. In this view the wheels are shown in retracted position.
Fig. 15 is an enlarged fragmentary detail view illustrating features of the shock absorber construction.
Fig. 16 is a fragmentary perspective view of another embodiment of a unitary combined retracting and shock absorbing mechanism.

In the embodiment of the invention illustrated in Figs. 13, 14 and 15, the fuselage of the airplane is indicated generally by the reference character 140. The front part of the fuselage is constructed to provide a compartment for the accommodation of a pilot and a passenger or copilot, for whom two seats 141 are provided. The upper portion of the compartment may comprise a transparent housing member 142 providing visibility for the passengers in all directions. The fuselage may be provided with elevators and a rudder and also a rudder wheel 26, as described in conjunction with the last described embodiment, so that the machine may be steered on the ground by means of the rudder controls.

The airplane is provided with ground contacting means near the nose of the fuselage, which means may take the form of a wheel 143 rotatably carried by a wheel yoke 144 at the end of a pivotally movable wheel supporting member 145. The member 145 is pivotally movable as about a pivot pin 146 suitably secured to the fuselage. The wheel and wheel support are adapted to be drawn up into a slot 147 in the fuselage, which is provided with an enlarged rear portion 148 to receive the wheel. In retracted position the wheel support 145 closes the slot 147 and the wheel fills up the rear portion 148 to provide a smooth outer form for the fuselage except for the small projecting portion of the wheel.

The wheel support 145 is projected and retracted, and held in retracted position by a linkage mechanism including a link 149 pivotally connected to the wheel support 145 and to an arm 150 rigidly mounted on a shaft 151 mounted for rotation about an axis disposed transversely of the fuselage. It will be noted that when the shaft is rotated in a clockwise direction as viewed in Fig. 14, the wheel and wheel support will be projected from the fuselage. When fully extended the arm 150 and link 149 have their common pivot located slightly forward of the two other axes of the linkage system, i. e., it is over center with respect to the latter so that any upward force will tend to move the linkage forwardly, which tendency is effectively prevented by a stop arrangement consisting of a projection 152 on arm 150 and a pin 153 on link 149.

The nose wheel and its supporting mechanism are actuated by a chain belt drive including a chain 154, a sprocket 155 on shaft 151, and a sprocket 156 on a shaft 157 rotatably supported in the fuselage near the seats 141. The shaft 157 also carries a sprocket wheel 158 and a hand wheel 159. The sprocket wheel 158 is operatively connected by a chain 160 to a sprocket 161 rotatably mounted on a shaft 162 which may be suitably located transversely of the fuselage at a low position therein. The sprocket 161 is resiliently connected to the shaft 162 for a purpose which will appear more fully hereinafter, as by means of a spring 161' having one end secured to the shaft and the other to the sprocket. The resilient connection provides a torque transmitting connection providing relative movement between the members to which it is connected when the torque exceeds a predetermined value. If desired, other means, such as a slip clutch, could be utilized for this purpose. The shaft 162 has secured thereto a pair of opposed bevel gears 163, only one of which is shown in Fig. 14. These bevel gears mesh with bevel gears 164, each of which is rigidly mounted on a shaft 165. The shafts 165 (of which only one is shown) are mounted for rotation in a substantially horizontal position in suitable bearings (not shown), so that they extend rearwardly and outwardly relative to the bevel gears 164 as best illustrated in Fig. 14.

The alighting wheels 166 are mounted on supporting members 167 secured to and rotating with the shafts 165, so that the wheels may be moved between retracted and extended positions. The wheels are mounted on stub axles 168 secured to the free ends of supports 167. The stub axles are so disposed that they extend substantially horizontally and rearwardly when the wheels are in their retracted positions, as shown in full lines in Fig. 14, and extend horizontally and transversely in their extended positions as shown in dotted lines in the same figure. The construction is preferably such that in retracted position the wheels are located immediately to the rear of the seats 141 within the fuselage. The wheels enter the fuselage through openings 169 in the bottom of the fuselage, and these openings are adapted to be closed by closure plates 170 when the wheels are in their retracted position. The closure plates may be suitably secured to the wheel supporting members 167, as by rods 171.

When the wheels are in their extended positions the wheel supports come into operative engagement with shock absorber mechanisms. The shock absorber mechanisms include plungers 172 adapted to abut against shoulders 173 on the wheel supports 167 so that the wheels support the fuselage with a certain degree of resilience. The shock absorber mechanisms include also cylinders 174 containing springs and hydraulic shock absorbing means and which may be suitably secured to the interior of the fuselage.

The retractable mechanisms are maintained in their retracted and projected positions by a detent mechanism including a notched disk 175 secured to the hand operated shaft 157 and a cooperating detent 176 spring biased toward the disk and adapted manually to be lifted out of the notch.

Assuming that the retractable mechanisms are in their retracted positions as shown in full lines in Fig. 14, then if it is desired to project them it is necessary first only to release the detent disk 175 by pulling the detent 176 upwardly against the bias of the spring associated with it. When this is done the alighting wheels 166 and the nose wheel 148 drop downwardly from their retracted position under the influence of gravity. Their projection is completed by rotation of the hand wheel 159, and when they have been projected the detent disk is again held by the detent to hold the wheels in projected position. When it is desired to retract the wheels the detent 176 is elevated and the hand wheel operated in the appropriate direction to elevate the wheels. When the wheels have retracted the detent is released and the wheels are accordingly again held in position by the detent mechanism.

The resilient connection between the sprocket 161 and shaft 162 utilized to actuate the alighting wheels is sufficiently strong to impart the requisite torque to actuate and to hold the alighting wheels in their various positions. However, when the wheels are in their projected positions in landing, then upon contact with the ground the wheels and their supports are moved in a clockwise direction about the axis 165 against the plunger of the shock absorber mechanism. Under these conditions the spring 161' yields to enable the shock absorber mechanism properly to function and also prevents damage to the positioning detent mechanism. It may be noted that in this construction, as in the others previously described, the landing wheels and their supports move from one side to the other of the axes of their movement, with the result that the weight of the plane tends to hold the alighting gear in retracted position, both during landing and at rest. The arrangement of Figs. 13, 14, and 15 is particularly advantageous in a construction wherein the wing includes a wing bar 177 extending through the fuselage behind the seats 141 and just above the wheels 166 in their retracted positions. The wings also include ribs 178 mounted in spaced relation along the length of the wing bar 177. The ribs are reinforced by braces 179.

The wheel supports and mounting illustrated in Figs. 13, 14, and 15, lend themselves to actuation by a unitary mechanism utilized also to perform the function of shock absorption. A construction of this character is shown in Fig. 16, to which reference is now had. The wheel support 167 for one of the wheels is rigidly secured to a horizontal shaft 165 inclined inwardly and forwardly of the fuselage. It is adapted to be rotated in opposite directions by a power shaft 180 connected, if desired, to a similar shaft associated with the other landing wheel (not shown). If desired, the power shafts 180 could be driven by individual motors.

The rotation of power shaft 180 is transmitted to shaft 165 through a slidable coupling 181, an axially movable shaft 182 journaled for rotation in bearings 183, a worm gear 184 rigidly secured to shaft 182 and a worm wheel 185 secured to shaft 165. The worm gear and worm wheel are irreversible, i. e., rotation of the gear effects rotation of the worm wheel but rotation of the latter tends only to produce axial movement of the worm gear. During extension of the alighting gear axial movement of shaft 182 and gear 183 is prevented by a shock absorber spring 186 mounted within an oil containing cylinder 187 and bearing against the end of the cylinder and a piston 188 at the adjacent end of shaft 182. The spring normally maintains the worm gear against the left bearing 183. The piston is provided with a valve (not shown) restricting flow of oil from one side to the other of the piston as it moves to the left, but permitting relatively free movement of oil when the piston moves to the right, as it does during compression of the spring. During retraction the shaft 182 is prevented from moving axially by one of the bearings 183.

Retraction and extension of the alighting gear and shock absorption are all effected by the mechanism. To retract or extend the mechanism it is necessary only to rotate shaft in one direction or the other. The worm gear 184 is prevented from moving axially by the spring 186 during extension and by one of bearings 183 during retraction so that rotation of shaft 180 produces rotation of worm wheel 185 and movement of the landing wheel. The irreversible drive of the worm gear and wheel prevents the landing wheel and its support from rotating the gear 185 and the power shaft so that the landing wheel stays in the position into which it is operated. On landing the force of the impact turns the wheel support 167 and worm wheel 185 further in the extending direction (clockwise, as viewed in Fig. 16) whereby worm gear 184 and shaft 183 are moved to the right to compress spring 186. This movement is substantially unrestricted because of the previously mentioned valve embodied in the piston. When the force of the impact decreases the spring forces the piston, and also the shaft 182, etc., back slowly until they all resume their normal extended positions, provided, of course, subsequent shocks are not transmitted before such return is effected. This construction thus also has a unitary mechanism for effecting retraction and extension and shock absorption and the movements for these all take place about a single axis, namely, that defined by shaft 165.

Figure 17:
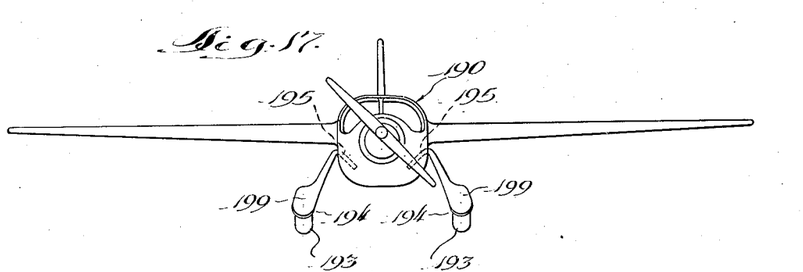
Fig. 17 is a front elevational view of another embodiment of the present invention.
Figure 18:
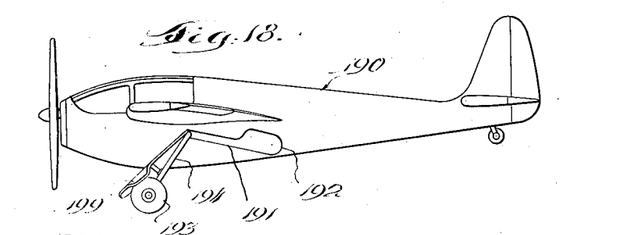
Fig. 18 is a side elevational view of the embodiment of Fig. 17.
Figure 19:
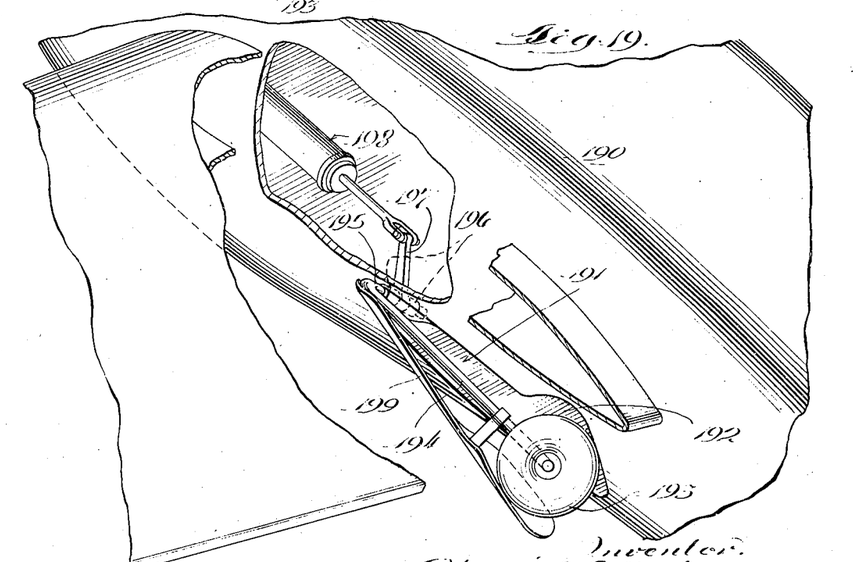
Fig. 19 is a fragmentary perspective view, on an enlarged scale, of the mounting and means for actuating the alighting gear.

The embodiment of the invention illustrated in Figs. 17, 18, and 19, is similar to that of Figs. 6 and 7, except that the wheels and supports are adapted to be moved farther forward, thereby to provide more clearance between the closure plate and ground when the alighting gear is in alighting position. In addition, the closure plate is adapted to close a recess in the fuselage for the wheel and supporting structure. Referring now more particularly to the drawings, it may be noted that the fuselage 190 is provided with an elongated recess 191 at its side, which recess is enlarged at its rear end as shown by reference character 192, to receive the wheel. While the details of but one recess have been shown, it should be understood that there are two such recesses, one at each side of the fuselage for the alighting wheels and supports at the respective sides. The alighting wheels 193 are rotatably carried at the free ends of pivotally movable supports 194, the opposite ends of which extend at substantially right angles to the main longitudinal portions to provide shaft portions 195 (see Fig. 18). The shaft portions 195 are rotatably supported in bearing blocks 196 secured to the fuselage and actuating arms 197 are secured to the shaft portions 195 intermediate the bearing blocks, so that a mechanism 198 like that described heretofore in connection with the first embodiment of the invention may be utilized to project and to retract the alighting gear. A closure plate 199 is secured to each wheel support, and it has a configuration such as to close the recess 191—192 when the alighting gear is in its retracted position. In this embodiment, as in the others, the closure plates are located above ground in the alighting position by movement of the wheel supports over center to the opposite sides of the axes of pivotal movement of the supports occupied by them in actuated position.

From the foregoing description of various embodiments of the present invention, it may be noted that the principles thereof may be embodied in structures of various forms. It should be understood, therefore, that the details of the specifically described embodiments are not intended to be limitative of the invention except in so far as set forth in the accompanying claims.

Having thus described my invention, what I claim as new and desire to secure by Letters Patent of the United States, is:

1. In an aircraft having landing gear movable between retracted and alighting positions, the combination including, a combined landing gear actuating and shock absorber mechanism including relatively movable members and spring means opposing relative movement in one direction between said members, means connecting one of said members to the landing gear in a manner providing relative movement between the landing gear and said one member, and means securing the other member to the aircraft.

2. In an aircraft having landing gear movable between retracted and alighting positions, the combination including, a combined landing gear actuating and shock absorber mechanism including relatively movable members, means for operatively connecting one of said members to the landing gear, means connecting the other member to the aircraft, means for effecting relative movement between said members to retract and extend the landing gear between its two positions, means permitting relative movement between said members under landing impact, and shock absorber means including compression spring means effective during said last mentioned relative movement.

3. In an aircraft having landing gear movable between retracted and alighting positions and for shock absorption, the combination including, a combined landing gear actuating and shock absorber mechanism including relatively movable members and spring means opposing relative movement in one direction between said members, means movably securing one of said members to the landing gear, and means securing the other member to the aircraft.

4. In an aircraft having landing gear movable about a single axis between retracted and alighting positions, the combination including, a combined landing gear actuating and shock absorber mechanism including a cylinder, a piston, spring means between said cylinder and piston, and hydraulic means for moving said piston, means securing said piston to the landing gear, and means securing said cylinder to the aircraft.

5. In an aircraft having landing gear pivotally movable about a single axis between retracted and alighting positions, the combination including, a fluid actuated mechanism for effecting relative movement of said landing gear between its two positions, said mechanism including a cylinder pivotally secured to the aircraft and a piston pivotally secured to the landing gear, means for supplying fluid to the cylinder to effect relative movement between the cylinder and piston, and means for restricting the flow of fluid from said cylinder whereby the mechanism acts as a shock absorber during landing.

6. In an aircraft having landing gear movable between retracted and alighting positions, the combination including, a fluid actuated combined landing gear actuating and shock absorber mechanism including members movable relatively by a fluid, means operatively connecting one of said members to the landing gear, means operatively connecting the other member to the aircraft, resilient means opposing movement of said members in a direction to effect extension of the landing gear and effective to retract said landing gear, means for supplying fluid to said mechanism to effect movement of said landing gear into its alighting position, and means permitting restricted flow of fluid for absorbing landing shock.

7. In an aircraft having landing gear pivotally movable between retracted and alighting positions, the combination including, a fluid actuated mechanism for effecting movement of said landing gear between its two positions, said mechanism including relatively movable members secured to the aircraft and to the landing gear, spring means biasing said members for movement in landing gear retracting direction, means for supplying fluid to the fluid actuated mechanism to effect relative movement between said members in opposition to said biasing means and for movement in landing gear extending direction, said movable members moving further in said extending direction under landing impact, and means for restricting the flow of fluid from said mechanism whereby the mechanism acts as a shock absorber during landing.

8. In an aircraft, landing gear pivotally movable about a single axis between retracted and alighting positions, a combined landing gear actuating and shock absorbing mechanism including a cylinder, a piston, spring means between said cylinder and piston adapted to be compressed to absorb the shock of landing impact, and hydraulic means for moving said piston and also compressing said spring means, means pivotally securing said piston to said landing gear at a point removed from said axis, and means pivotally securing said cylinder to said aircraft.

9. In an aircraft, landing gear pivotally movable about an axis between retracted and alighting positions and having a portion removed from said axis, a combined landing gear actuating and shock absorbing mechanism including relatively movable members, means for pivotally connecting one of said members to said portion of the landing gear, means pivotally connecting the other member to the aircraft, hydraulic means for effecting relative movement between said members pivotally to move said landing gear to move it from its retracted to its alighting position, said relatively movable members being movable under landing impact. and shock absorber means including compression spring means compressible by said hydraulic means and upon landing impact, said spring means being operatively connected to said relatively movable members and effective to return said landing gear to its retracted position.

10. In an aircraft, landing gear movable pivotally about a single axis between retracted and alighting positions, said gear including a wheel supporting member having portions extending in opposite directions from said axis and movable about said axis, a wheel secured in one of said portions, landing gear actuating mechanism including relatively movable members, means pivotally connecting one of said members to the other portion of said landing wheel supporting member, means pivotally connecting the other member to the aircraft, and means including shock absorber mechanism for effecting relative movement between said members to move the landing wheel supporting member about said axis between its said two positions, said shock absorber mechanism including hydraulic actuating means for moving said relatively movable members and a spring compressed thereby, said spring being also compressible further as a result of the impact of landing.

11. In an aircraft having landing gear pivotally movable about a single axis between retracted and alighting positions, the combination including a fluid actuated mechanism for effecting relative movement of said landing gear between its two positions, said mechanism including relatively movable elements comprised of a piston and cylinder combinations, one of said elements being pivotally secured to the aircraft and the other of said elements being pivotally secured to the landing gear, means for supplying fluid to the cylinder to effect relative movement between the cylinder and piston, and means for restricting the flow of fluid from said cylinder whereby the mechanism acts as a shock absorber during landing.

12. In an aircraft having landing gear movable about a single axis between retracted and alighting position, the combination including a combined landing gear actuating and shock absorber mechanism including relatively movable elements comprised of a piston and cylinder combination, spring means between said cylinder and piston, hydraulic means for moving said piston, one of said elements being secured to the aircraft and the other of said elements being secured to the landing gear.

EDWARD F. ANDREWS.

REFERENCES CITED

The following references are of record in the file of this patent:

UNITED STATES PATENTS

| Number | Name | Date |
| --- | --- | --- |
| 1,442,155 | Klemin | Jan. 16, 1923 |
| 1,747,563 | Yonkese | Feb. 18, 1930 |
| 1,757,687 | Silva, Jr. | May 6, 1930 |
| 1,768,696 | Laddon | July 1, 1930 |
| 1,885,392 | Tuten | Nov. 1, 1932 |
| 2,090,036 | Frise | Aug. 17, 1937 |
| 2,091,509 | Kramer | Aug. 31, 1937 |
| 2,180,462 | De Seversky | Nov. 21, 1939 |

FOREIGN PATENTS

| Number | Country | Date |
| --- | --- | --- |
| 338,502 | Italy | Mar. 31, 1936 |
| 412,593 | Great Britain | June 29, 1934 |
| 469,965 | Germany | June 4, 1928 |
| 556,531 | France | Apr. 16, 1923 |
| 584,330 | France | Nov. 18, 1924 |
| 632,964 | Germany | July 6, 1936 |
| 698,049 | Germany | Oct. 31, 1940 |

Certificate of Correction

Patent No. 2,487,405

November 8, 1949

EDWARD F. ANDREWS

It is hereby certified that errors appear in the printed specification of the above numbered patent requiring correction as follows:

Column 15, line 33, for "combinations" read *combination*; column 16, line 35, list of references cited, for the patent number "469,965" read *460,965*; and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*